United States Patent [19]

Ohta et al.

[11] Patent Number: 4,720,717

[45] Date of Patent: Jan. 19, 1988

[54] RECORDING AND WAVEFORM FORMING APPARATUS

[75] Inventors: Morio Ohta; Shizuo Tsuchiya, both of Tokyo, Japan

[73] Assignees: Casio Computer Co., Ltd.; Casio Electronics Manufacturing Co., Ltd., both of Tokyo, Japan

[21] Appl. No.: 45,191

[22] Filed: Apr. 30, 1987

Related U.S. Application Data

[63] Continuation of Ser. No. 769,692, Aug. 27, 1985, abandoned.

[30] Foreign Application Priority Data

Aug. 30, 1984 [JP] Japan .................................. 59-179396

[51] Int. Cl.4 ................................................ G02F 1/13
[52] U.S. Cl. ...................................... 346/160; 350/332; 346/154
[58] Field of Search ................... 346/154, 160, 107 R, 346/108; 350/332, 333, 347 E; 364/523, 518, 519

[56] References Cited

U.S. PATENT DOCUMENTS

| 4,386,836 | 6/1983 | Aoki et al. | 346/160 |
| 4,496,214 | 1/1985 | Altman | 350/332 |

FOREIGN PATENT DOCUMENTS 57-171378  10/1982  Japan .................................. 346/160

*Primary Examiner*—Arthur G. Evans
*Attorney, Agent, or Firm*—Sandler & Greenblum

[57] ABSTRACT

A waveform forming device comprises a light source, a liquid crystal light shutter for passing or preventing the light of the light source and a driving circuit for driving a plurality of electrodes of the liquid crystal light shutter by using drive control signals including a signal of a high frequency $f_H$ and a signal of a low frequency $f_L$. The frequencies $f_H$ and $f_L$ are respectively higher and lower than the frequency which makes a liquid crystal dielectric anisotropy zero. The waveform forming device has a ROM in which a plurality of basic control signals are stored, a counter for addressing a desired memory areas of the ROM and a waveform selector for selecting the basic control signals. The drive control signals are formed by combining the basic control signals, thereby to provide a desired drive pattern signal.

3 Claims, 12 Drawing Figures

RECORDING AND WAVEFORM FORMING APPARATUS

This application is a continuation of application Ser. No. 769,692 now abandoned, filed Aug. 27, 1985.

BACKGROUND OF THE INVENTION

The present invention relates to the generation of drive signals in the recording apparatus and other related devices.

The recording apparatus in which liquid crystal light shutters are employed is intended to carry out light writing on a recording body in such a way that a plurality of micro shutters in the liquid crystal light shutter are driven open or closed by a control circuit so as to transmit or shield the light of a light source. Liquid crystal needs so as to have high speed response in the case of this recording apparatus. Therefore, the liquid crystal light shutter is usually formed by a liquid crystal material whose dielectric anisotropy is inverted by the frequency of an electric field, and it is driven by two frequencies $f_H$ and $f_L$, higher and lower, resectively, than a frequency $f_C$ which makes the dielectric anisotropy of the liquid crystal zero. Therefore, the conventional control circuit for the liquid crystal light shutter is provided with two oscillators for generating the signals of the frequencies $f_H$ and $f_L$, and with a generator for generating pattern signals which are formed by various combinations of $f_H$ and $f_L$.

In FIG. 1, a read-only memory (which will be hereinafter referred to as ROM) 1 applies a data signal 4 to a flip-flop 5 when it receives an address A signal 2 for reading out the information of the ROM 1 and an address B signal 3 which contains a step signal. The flip-flop 5 advances step by step, synchronously with a clock signal 6, and outputs a needed pattern signal 7. The flip-flop 5 also outputs the address B signal 3 at the same time to select optional addresses in the ROM 1, thereby enabling complicated control to be achieved.

In the case of the conventional recording apparatus, the viscosity of liquid crystal shows remarkable change, depending upon temperature. Therefore, the voltage of signals applied to the liquid crystal light shutters is changed, corresponding to temperature change, to compensate the temperature of liquid crystal. Further, the temperature compensation of liquid crystal is sometimes attained by changing the frequencies of signals of $f_H$ and $f_L$ applied to the liquid crystal light shutters.

The conventional recording apparatus employs random logic which represents combinations of gate circuits for generating pattern signals, but the characteristics of light shutters, recording bodies, light sources, etc., change depending upon circumferential conditions and combinations of means, thereby making it necessary to sometimes change the pattern signal. The logic circuit which generates only the fixed pattern signals cannot meet the needs and so it must be recombined again. In the case where the light shutters are improved after the completion of a logic circuit, for example, it is necessary to again recombine or reconstruct the completed logic circuit.

On the other hand, when the voltage of the signal applied to the liquid crystal light shutters is changed in the case where circumferential temperature changes occur, the driven operation of the liquid crystal light shutters may become unstable. In addition, changing the frequency of signal $f_H$ by a large measure cannot achieve great effect when the temperature changes remarkably.

SUMMARY OF THE INVENTION

The present invention is therefore intended to eliminate the above-mentioned drawbacks. The object of the present invention is to provide a recording apparatus wherein a pattern signal is selected from a plurality of drive pattern signals and applied to liquid crystal light shutters to provide optimum characteristics even when various conditions change.

DETAILED DESCRIPTION OF THE INVENTION

Figure 2A:
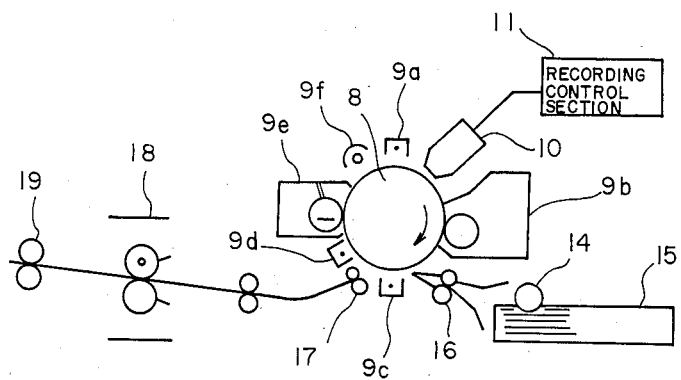
FIG. 2A shows an arrangement of the recording apparatus, FIG. 2B an arrangement of the liquid crystal head section, FIG. 2C an arrangement of the liquid crystal light shutters.

FIG. 2A shows an arrangement of the recording apparatus wherein uniform charge is previously applied to the surface of a photosensitive drum 8 by means of a charger 9a. A liquid crystal head section 10 is driven by a recording control section 11, which controls timing and other operations responsive to recording information, to carry out light writing on the surface of the photosensitive drum 8 so as to form an electrostatic latent image thereon. The electrostatic latent image thus formed is toner-developed visible by means of a developing means 9b. Further, the toner image is transferred onto a sheet of paper which is picked up from a cassette 15 by means of a paper feeding roller 14 and timely introduced by a waiting roller 16. After it is separated by a separator 17, the sheet of paper is passed through a fixing means 18 and then fed outside by a paper feeding-out roller 19. On the other hand, the toner which has not been transferred to the paper completely by means of the transfer means 9c remains on the surface of the photosensitive drum 8. Therefore, the charge of the toner is neutralized by a discharger 9d and cleaned at a cleaning section 9e. Further, the surface of the photosensitive drum 8 is erased by an eraser 9f to remove charge therefrom and subjected to uniform charging through the charger 9a to become ready for another light writing.

Figure 2B:
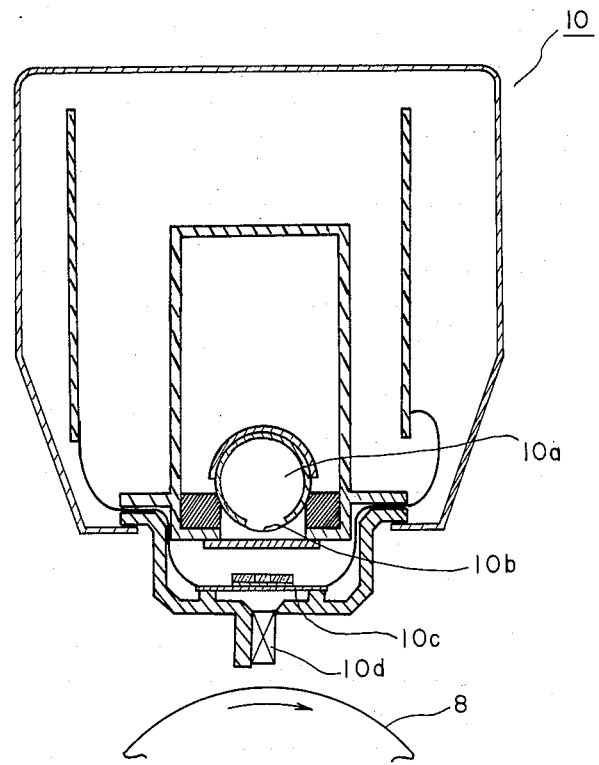
FIG. 2D is a sectional view showing the liquid crystal light shutters in FIG. 2C.

As shown in FIG. 2B, a fluorescent lamp of the aperture type, a part of the circumference of which is opened, is employed as a light source 10a at a liquid crystal head section 10, and light is emitted only through the opened portion 10b. The light emitted through the opened portion 10b of the light source 10a is modulated by liquid crystal light shutter 10c, which is controlled open or closed responsive to recording signals, and it is exposed onto the photosensitive drum 8 through an imaging lens 10d.

Figure 2C:
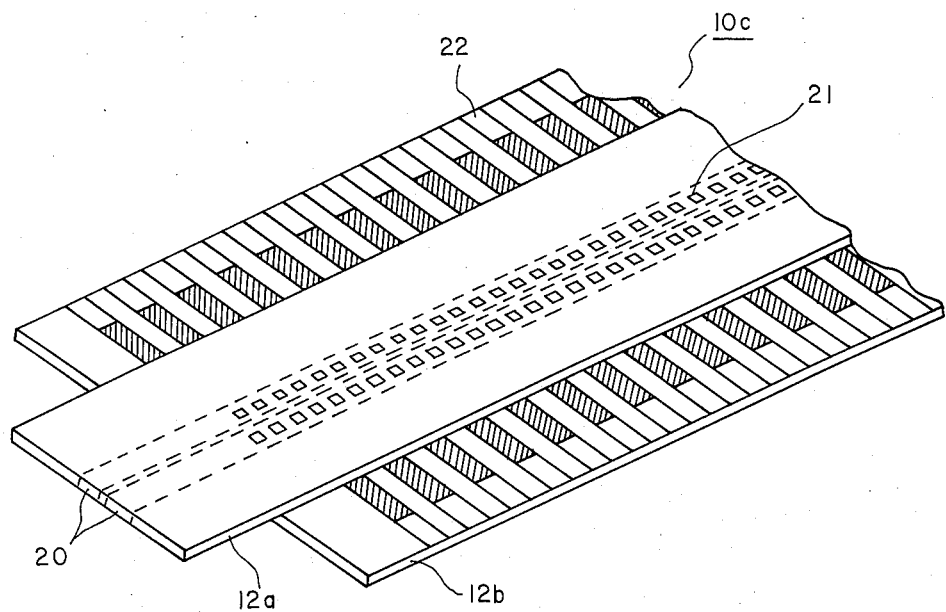
Figure 2D:
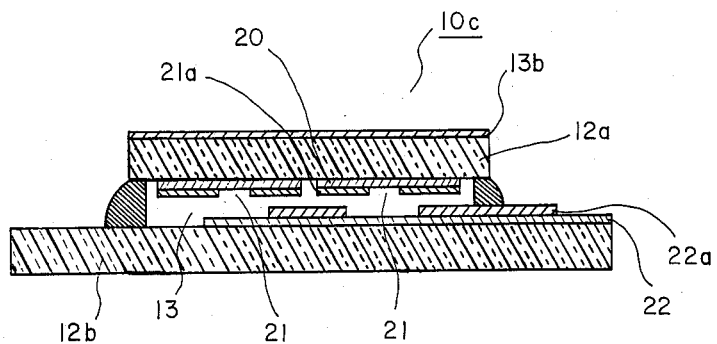

FIG. 2C shows an arrangement of the liquid crystal light shutter 10c and FIG. 2D is a sectional view showing the liquid crystal light shutter 10c. A liquid crystal material 13 is sealed between two glass plates 12a and 12b, two transparent common electrodes 20 are arranged under the glass plate 12a, and that portion of these transparent common electrodes 20 where micro shutters 21 are not formed is coated by a chrome plating 21a. On the other hand, a plurality of transparent signal electrodes 22 are similarly arranged on the glass plate 12b, and that portion of these signal electrodes 22 where the micro shutters 21 are not formed is also coated by a chrome plating 22a. Further, a polarizing plate 13b for polarizing incident light is arranged on the glass plate 12a.

Figure 3:
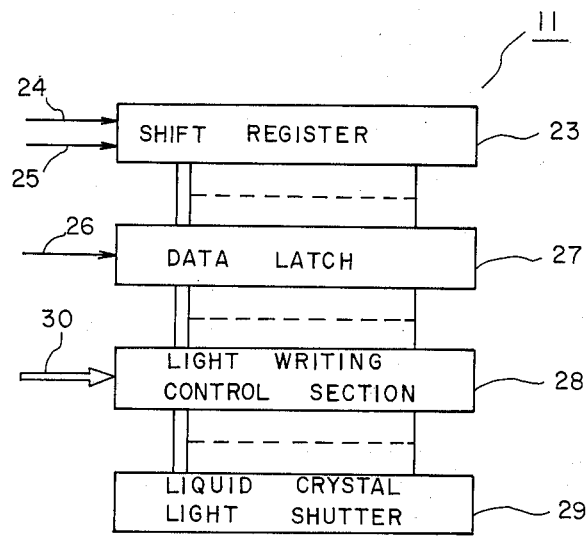
FIG. 3 is a circuit diagram for driving the liquid crystal light shutters.

FIG. 3 is a block diagram showing a part of recording control section 11 employed by the recording apparatus which has the above-described arrangement. Recording data 24 is applied to a shift register 23, synchronously with a transfer clock 25, and the recording data 24 having n-bits is held in the shift register 23. The recording data 24 is applied to a data latch 27, responsive to a latch signal 26, and temporarily held by the data latch 27, while the next recording data 24 is applied to the shift register 23. The recording data 24 held by the data latch 27 is then applied to a light writing control section 28 to select one pattern signal of a plurality of drive pattern signals 30 which serve to drive liquid crystal light shutter 29. The liquid crystal light shutter 29 is driven by this selected pattern signal.

Figure 4:
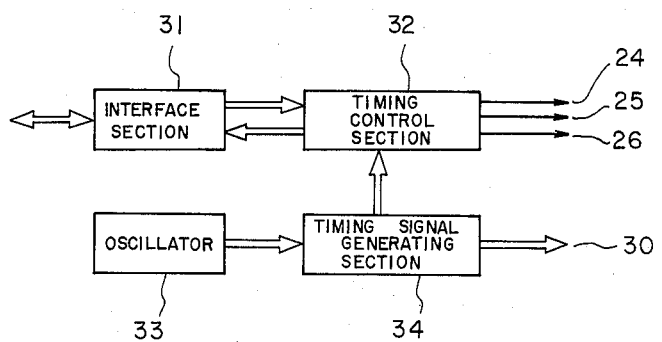
FIG. 4 is a circuit diagram for generating various signals.

FIG. 4 is a block diagram showing another circuit of the recording control section 11 for generating the above-described recording data 24, transfer clock 25, latch signal 26 and plurality of pattern signals 30. An interface section 31 serves to receive the recording data 24 and various kinds of information such as commands and status from the CPU, controller, etc. located outside the recording apparatus. A timing control section 32 controls the timing between the writing synchronization of liquid crystal light shutter and the reception of recording data 24 and outputs the recording data 24, which has been applied to the interface section 31, to the above-mentioned shift register 23 in a manner of serial transfer. The output of an oscillator 33 is applied to a timing signal generating section 34 to form the transfer clock 25, latch signal 26 and drive pattern signals 30. The transfer clock 25 and latch signal 26 are outputted to the shift register 23 and data latch 27 through the timing control section 32 and the drive pattern signals 30 are outputted from a timing signal generating section 34 directly to the above-mentioned light writing control section 28.

Figure 5:
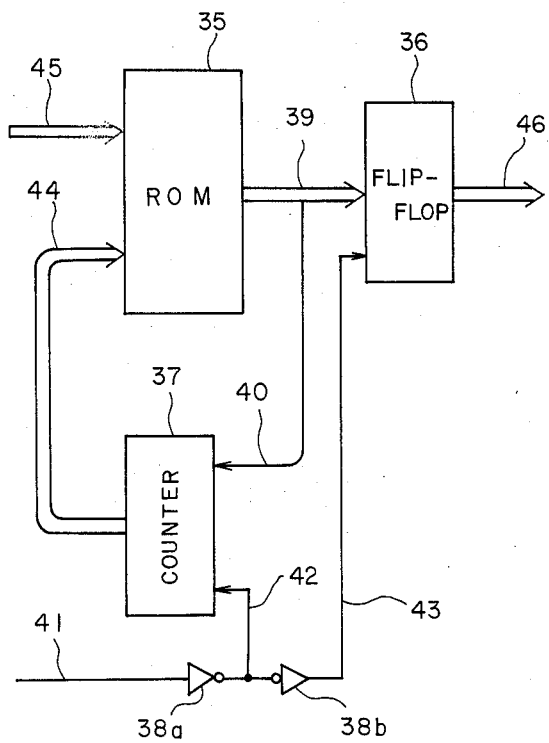
FIG. 5 is a block diagram showing a program sequencer employed by the present invention.

The gist of the present invention exists in the circuit for generating the drive pattern signals 30, said circuit forming a part of the circuit for the timing signal generating section 34. FIG. 5 is a block diagram showing the circuit for generating the pattern signals 30 and comprising a ROM 35 in which program information is stored, flip-flop 36, counter 37 and inverters 38a, 38b. Data signal 39 in the ROM 35 is applied to the flip-flop 36 while a part of it becomes a load signal 40 for the counter 37. A clock signal 41 is inverted by the inverter 38a to become a clock signal 42 for the counter 37, and it is further inverted by the inverter 38b to become a clock signal 43 for the flip-flop 36. The output signal of the counter 37 becomes an address D signal 44 for the ROM 35 to designate an address of the ROM, together with an address C signal 45. An output signal 46 of the flip-flop 36 becomes the drive pattern signal 30, which is applied to the light writing control section 28.

Figure 6:
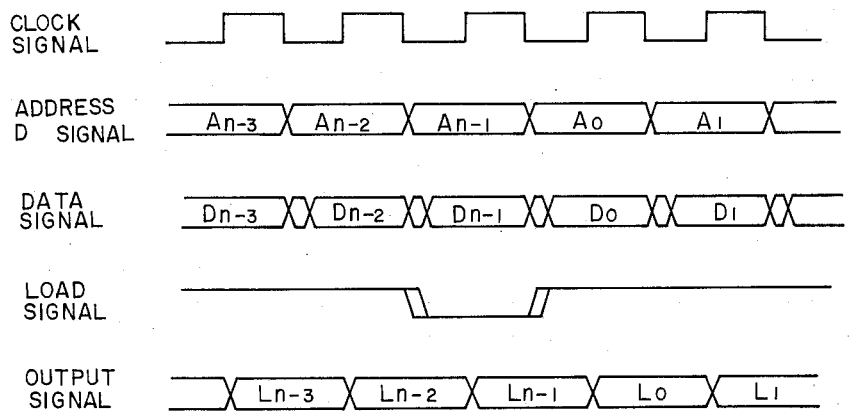
FIG. 6 is a timing chart.

FIG. 6 is a timing chart intended to explain the operation of forming the above-described drive pattern signals 30, wherein it is assumed that the needed drive pattern signal 30 is subject to a n-time division and advanced by one step every clock signal 43. The counter 37 counts up at the falling of the clock signal 42 and the data signal is thus changed at the falling of the clock signal 42. Providing that a fixed signal is inputted from the address C signal 45, the address of the ROM 35 is designated synchronously with the address D signal 44 to apply the data signal 39 to the flip-flop 36. At this timing, the load signal 40 which is a part of the data signal 39 is inputted into the counter 37 at a certain cycle to thereby pre-set the counter 37. When the counter 37 is pre-set, the addressing of the ROM 35 is repeated again, that is, n-step of $A_0$-$A_{n-1}$ is repeatedly carried out, and the output signal 46 is picked up from the flip-flop 36 as a periodical pattern of $L_0$-$L_{n-1}$.

Figure 7:
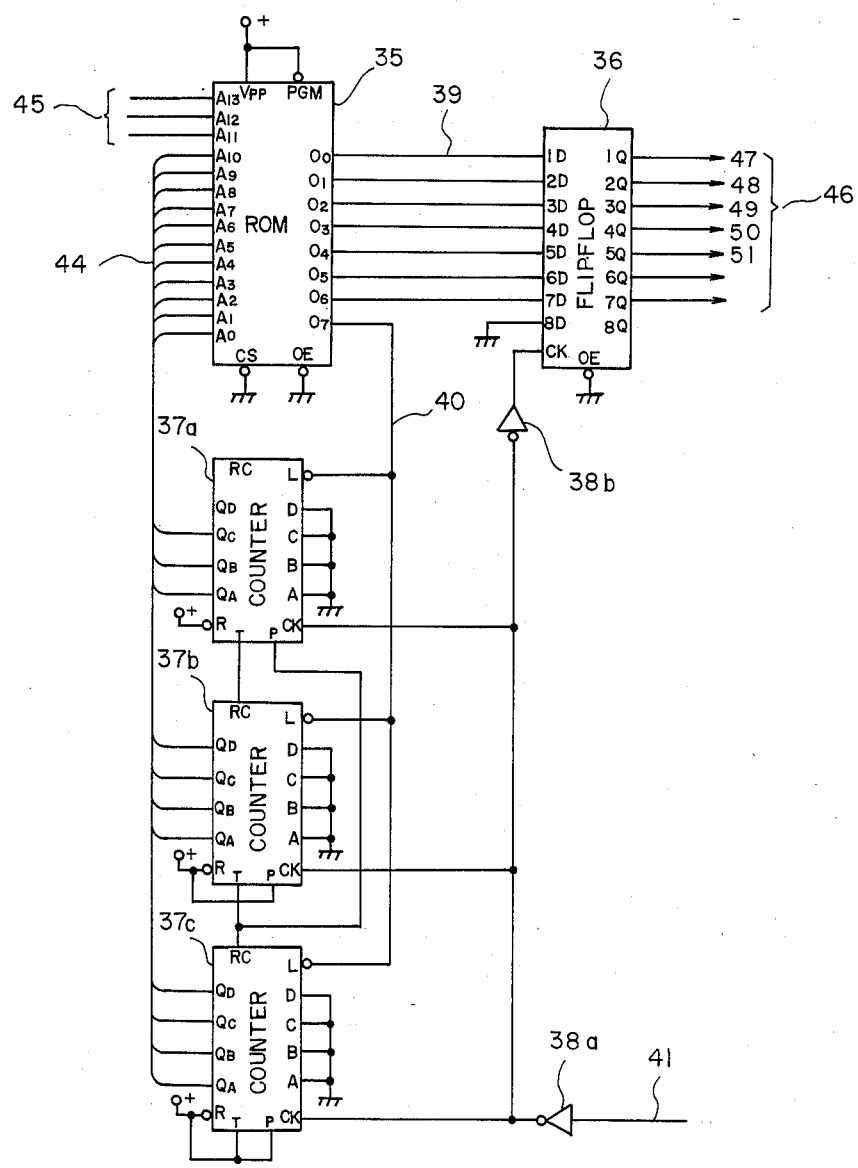
FIG. 7 shows a circuit diagram of an embodiment according to the present invention.

FIG. 7 is a diagram showing a concrete circuit of the block diagram in FIG. 5 and shows an embodiment of the present invention. The address D signal 44 comprises eleven signal lines and is inputted from three parallelly-connected counters 37a-37c to the ROM 35. The address C signal 45 comprises three signal lines and is inputted to the ROM 35. The data signal 39 of the ROM 35 is outputted to the flip-flop 36 through seven signal lines and the output signal 46 is generated through seven signal lines. Since the number of signal lines for the address D signal 44 is eleven, the address D signal 44 can be divided in maximum to 2048 of $A_0$-$A_{2047}$, and since the number of signal lines for the address C signal 45 is three, eight kinds of pattern selection can be made. The output of the ROM 35 is outputted through eight signal lines of $O_0$-$O_7$, but the load signal 40 uses only one of them, so that the remaining seven can be used for the data signal 39.

Figure 8:
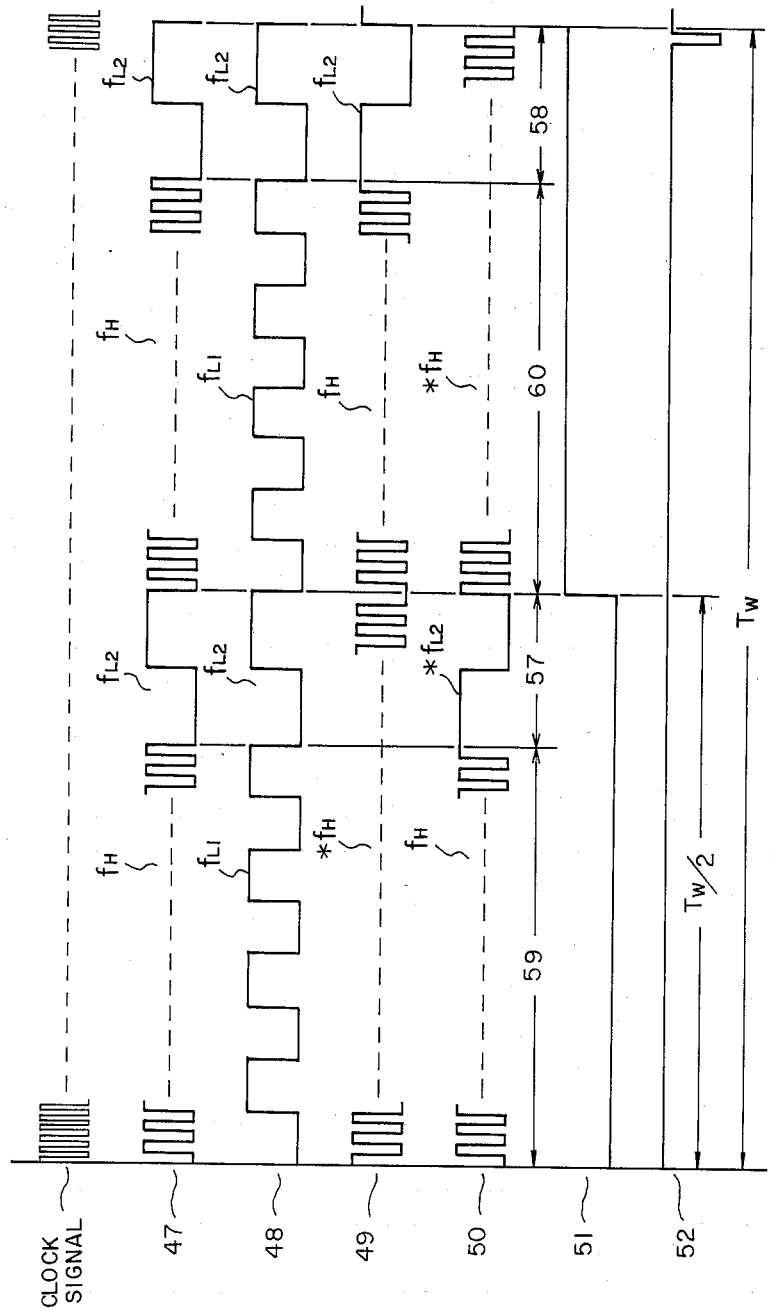
FIG. 8 is a timing chart embodied according to the present invention.

FIG. 8 is a waveform diagram for the output signal 46 obtained when the memory area in the ROM 35, which has truth values shown in Table 1. is selected responsive to the address C signal 45.

TABLE 1

| Address | Data | | | | | |
|---|---|---|---|---|---|---|
| | S2 | S1 | C2 | C1 | S2 | S1 |
| 000H | 1 | 0 | 0 | 1 | 0 | 0 |
| 001 | 1 | 0 | 1 | 0 | 0 | 1 |
| 003 | 1 | 0 | 0 | 1 | 0 | 0 |
| 004 | 1 | 0 | 1 | 0 | 0 | 1 |
| 005 | 1 | 0 | 0 | 1 | 0 | 0 |
| 006 | 1 | 0 | 1 | 0 | 0 | 1 |
| 007 | 1 | 0 | 0 | 1 | 0 | 0 |
| 008 | 1 | 0 | | | | |
| 4AB | 1 | | | | | |
| 4AC | 1 | 1 | 1 | 0 | 1 | 1 |
| 4AD | 1 | 1 | 0 | 0 | 1 | 1 |
| 4AE | 1 | 1 | 1 | 0 | 1 | 1 |
| 4AF | 0 | 1 | 0 | 0 | 1 | 1 |
| 4B0 | 0 | 1 | 1 | 1 | 1 | 1 |
| 4B1 | 0 | 1 | 1 | 1 | 1 | 1 |
| 4B2 | 0 | 1 | 1 | 1 | 1 | 1 |
| | | 1 | 1 | 1 | | |
| 7FC | | | | | | 1 |
| 7FD | 0 | | | | | 1 |
| 7FE | 0 | 1 | 1 | 1 | 1 | 1 |
| 7FF | 0 | 1 | 1 | 1 | 1 | 1 |

A signal having a waveform 47 shown in FIG. 8 is obtained from an output 1Q of the flip-flop 36, and a signal having a waveform 48 is obtained from an output 2Q. Similarly, signals having waveforms 49, 50, 51 are obtained from outputs 3Q, 4Q and 5Q, respectively. A signal having a waveform 52 shown in FIG. 8 represents a timing at which the load signal 40 shown in FIG. 7 is outputted. Particularly, FIG. 8 shows waveforms for driving the liquid crystal light shutter in a 2-time division manner, and it is assumed in FIG. 8 that the signal $f_H$ or $*f_H$ (which is shifted by 180° in phase from the signal $f_H$) is obtained by dividing the frequency of the clock signal. When the frequency of the signal $f_H$ is set to 300 KHz, a signal of 600 KHz is employed as the clock signal. This embodiment is intended to use 2-time division drive. When one writing cycle $T_W$ relative to the photosensitive body is divided into 1200 steps by means of the counters 37a–37c, therefore, the address D signal 44 repeats 000H–4AFH (H represents a hexadecimal digit) in Table 1 at the cycle $T_W$. More specifically, when the address D signal 44 is inputted to the ROM 35, the load signal 40 is outputted to the counters 37a–37c through the output 7Q of the ROM 35, thereby not to affect the output signal 46 from 4B0H to 7FFH thereafter.

When the waveforms 47–50 are inputted to the recording signal and writing selection electrodes of the liquid crystal light shutter, therefore, the liquid crystal light shutter can be driven. When the signals having the waveforms 48 and 49 shown in FIG. 8 are applied to both electrodes of the liquid crystal light shutter, for example, a signal having a superposed waveform shown in FIG. 9 can be obtained, and when the signals having the waveforms 47 and 49 are applied to both electrodes similarly, a signal having a superposed waveform 56 can be obtained. When the waveforms 48 and 49 are inputted during the first half $T_W/2$ of the cycle $T_W$ and the waveforms 47 and 49 during the second half $T_W/2$ thereof, a superposed waveform 54 can be obtained. And when the waveforms 47 and 49 are inputted during the first half $T_W/2$ of the cycle $T_W$ and the waveforms 48 and 49 during the second half $T_W/2$ thereof, a superposed waveform 55 can be obtained.

Figure 9:
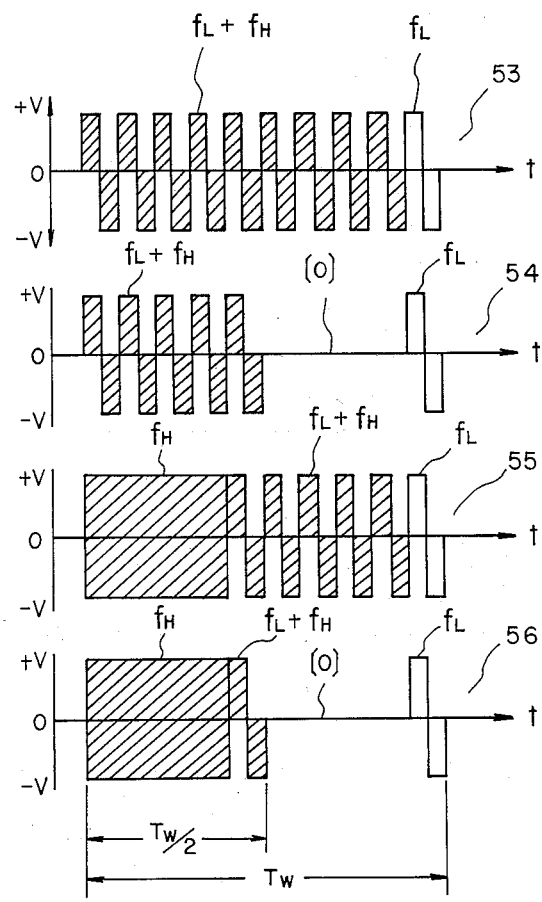
FIG. 9 shows drive pattern waveforms.

In the case of performing 2-frequency drive of the liquid crystal light shutter according to the 2-time division drive, the signals having the waveforms 53–56 thus formed are used as on-on, on-off, off-on and off-off drive signals. The signal having the waveform 51 is used as a signal for selecting the plural micro shutters in the liquid crystal light shutter, and it discriminates between selection and non-selection during the time period $T_W$. The signals of $*f_H$ and $*f_{L2}$ shown in FIG. 8 have waveforms which are shifted by 180° in phase from those of $f_H$ and $f_{L2}$, shown as (0) in FIG. 9, represents an electroless field, and the signal of $f_L+f_H$ represents a superposed signal between $f_L$ and $f_H$.

Figure 1:
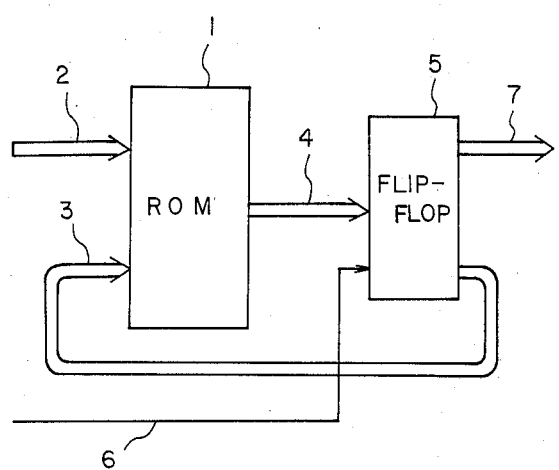
FIG. 1 is a block diagram showing the conventional program sequencer.

Using the signals having the waveforms 47–50 shown in FIG. 8 in this manner, the liquid crystal light shutter can be driven open or closed according to the 2-frequency and 2-time division drive. Namely, the liquid crystal light shutter can be driven, as descrived above, by memories values shown in Table 1 stored in the ROM 35 in FIG. 1.

In a case where the combination characteristic of liquid crystal light shutter, light source and photosensitive body is changed because they are improved, or in a case where the viscosity of liquid crystal is changed by atmospheric temperature, memories having other truth values and stored in the ROM 35 are selected from outside by dip switches or the like, using the address C signal 45. As shown in Table 2, for example, offset addresses 0800H, 1000H, −3800H at modes 2–8 are designated and selected by the address C signal 45.

TABLE 2

| Mode | Offset Address |
|------|----------------|
| 1 | 0000H |
| 2 | 0800 |
| 3 | 1000 |
| 4 | 1800 |
| 5 | 2000 |
| 6 | 2800 |
| 7 | 3000 |
| 8 | 3800 |

Stored in memories covering the modes 2–8 are data relating to waveforms in which the ratio of $T_L$ time periods 57 and 58 is changed in relation to the cycle $T_W$ and in which two waves of the signal $f_L$ are inserted for the $T_L$ time periods 57 and 58. These waveform data are stored in the ROM 35 as various steps from the stage of disabling the hysteresis of the liquid crystal light shutter to the stage of enabling the hysteresis of the liquid crystal light shutter. The hysteresis of the liquid crystal light shutter means that on- or off-state for the first half period $T_W/2$ is held the same for the second half period $T_W/2$ in the manner of the 2-time division.

When a mode optimum to meet the atmospheric temperature and combination of liquid crystal light shutter, light source and photosensitive body is selected from outside, therefore, an optimum drive pattern can be obtained for the liquid crystal light shutter.

Instead of the signals of $f_{L2}$ and $*f_{L2}$ for the $T_L$ time periods 57 and 58, those obtained by inserting different waveforms in selection time periods 59 and 60 may be stored in the modes 2–8.

According to the embodiments described above, 8 kinds of memory areas as shown in Table 2 can be selected from outside and a drive pattern optimum to meet the atmospheric temperature and combination of a liquid crystal light shutter, light source and photosensitive body can be thus obtained. Further, even when parameters in the recording apparatus, such as the temperature of the liquid crystal light shutter, light amount of the light source, recording density, and surface potential of the photosensitive body, change, a signal having a drive pattern optimum to meet the change of these parameters can be applied to the liquid crystal light shutter.

In a case where recording is made, giving an emphasis to its black, or with medium density, depending upon the contents of printing, a signal of the needed drive pattern can be selected directly or through the interface or the like from outside the recording apparatus. Although 13 units of ICs (or integrated circuits) were needed when the conventional circuit shown in FIG. 1 was made by commercially-available discrete parts, it can be made by 6 units of ICs according to the embodiments of the present invention, thereby enabling the recording apparatus to be small in size. Further, the program sequencer which uses the ROM 35 can be applied to the pattern generating section which has a certain period, thereby making the cost lower than in the case of conventional random logic, gate array of PLA (or programmable array logic).

It should be understood that the present invention cannot be limited to the above-described embodiments.

The number of the address C signals 45 is not limited to three but may be any other numerals. The number of the address D signals 44 is neither limited to 11, but it may be arranged so that the number of address D signals 44 is made larger, using four, five or more counters 37, to generate signals having more complicated waveforms 47-51. In addition, the number of output signals is not limited to seven, but more complicated drive patterns can be formed using a larger number of signals.

According to the present invention described above in detail, signals having drive patterns optimum to meet any change in a combination between the liquid crystal light shutter, photosensitive body and light source, an atmospheric temperature, humidity and light amount of the light source can be supplied to the liquid crystal light shutter, thereby making it easier to design the driver circuit, particularly drive pattern generator circuit for the recording apparatus. In addition, materials for the liquid caystal light shutter, photosensitive body and light source can be improved freely, thereby enabling a smaller-sized and lower-cost recording apparatus to be realized, as compared with the conventional apparatus in which the random logic was employed.

What is claimed is:

1. A recording control section for a recording apparatus having a head section for producing a plurality of beams of light modulated in accordance with image information which are incident on a photosensitive surface for producing an electrostatic latent image thereon, said control section comprising:
    (a) a light source for producing light;
    (b) an array of liquid crystal shutters defined by overlapping signal and common electrodes for selectively effecting the passage of light produced by said light source in accordance with a control signal applied to said electrodes, said control signal including combinations of signals of frequency $f_H$ higher than the frequency $f_C$ which makes the dielectric anisotropy of the liquid crystal zero, and of frequency $f_L$ lower than the frequency $f_C$; and
    (c) control means for generating control signals comprising:
        (1) a counter for outputting an address signal when a clock signal is applied;
        (2) waveform selector means for outputting an address signal;
        (3) storage means for storing a plurality of binary values functionally related to different basic control signals and outputting a data signal in response to the address signals produced by said counter and said waveform selector; and
        (4) means responsive to said clock signal and said data signal for producing a drive pattern signal that determines the control signal applied to said electrodes.

2. A recording control section according to claim 1 wherein said waveform selector means is adjustable to modify the address signal outputted therefrom whereby the nature of said drive pattern signal is optimized to fit given environmental conditions.

3. A recording control section according to claim 2 wherein said waveform selector means includes a switch means to establish the address outputted therefrom.

* * * * *

UNITED STATES PATENT AND TRADEMARK OFFICE
CERTIFICATE OF CORRECTION

PATENT NO. : 4,720,717

DATED : January 19, 1988

INVENTOR(S) : Morio OHTA et al.

It is certified that error appears in the above-identified patent and that said Letters Patent is hereby corrected as shown below:

In the Abstract, line 11, delete "a" after "addressing" and before "desired".

In the Abstract, bottom line, change "to provide" to ---providing---.

At column 1, line 18, delete "so as".

At column 1, line 23, change "resectively" to ---respectively---.

At column 3, line 44, insert ---the--- after "of" and before "liquid".

At column 3, line 57, change "said" to ---this---.

At column 4, line 9, change "a" to ---an---.

At column 4, line 44, change "." after "1" to ---,---.

At column 5, line 61, change "descrived" to ---described---.

At column 6, line 65, change "of" to ---or---.

At column 7, line 19, change "caystal" to ---crystal---.

Signed and Sealed this

Twenty-fifth Day of April, 1989

Attest:

DONALD J. QUIGG

*Attesting Officer*  *Commissioner of Patents and Trademarks*